(12) United States Patent
Thomas et al.

(10) Patent No.: US 10,120,702 B2
(45) Date of Patent: *Nov. 6, 2018

(54) PLATFORM SIMULATION FOR MANAGEMENT CONTROLLER DEVELOPMENT PROJECTS

(71) Applicant: AMERICAN MEGATRENDS, INC., Norcross, GA (US)

(72) Inventors: Satheesh Thomas, Dunwoody, GA (US); Baskar Parthiban, Johns Creek, GA (US); Rajeswari Ravichandran, Duluth, GA (US); Pavithra Sachidanandam, Duluth, GA (US); Aruna Venkataraman, Duluth, GA (US); Senathipathy Thangavel, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/207,905

(22) Filed: Jul. 12, 2016

(65) Prior Publication Data

US 2018/0018189 A1 Jan. 18, 2018

(51) Int. Cl.
*G06F 9/455* (2018.01)
*G06F 8/77* (2018.01)
*G06F 9/4401* (2018.01)
*G06F 8/654* (2018.01)

(52) U.S. Cl.
CPC .............. *G06F 9/455* (2013.01); *G06F 8/654* (2018.02); *G06F 8/77* (2013.01); *G06F 9/4411* (2013.01)

(58) Field of Classification Search
CPC . G06F 9/455; G06F 8/77; G06F 8/654; G06F 9/4411
See application file for complete search history.

(56) References Cited

U.S. PATENT DOCUMENTS

| 8,417,774 B2* | 4/2013 | Flynn | G06F 3/0613 709/204 |
| 9,436,491 B1* | 9/2016 | Chiou | G06F 9/45545 |
| 2008/0205286 A1* | 8/2008 | Li | H04L 1/243 370/249 |
| 2009/0249319 A1* | 10/2009 | Bai | G06F 9/45533 717/168 |

(Continued)

*Primary Examiner* — S. Sough
*Assistant Examiner* — Timothy P Duncan
(74) *Attorney, Agent, or Firm* — Locke Lord LLP; Tim Tingkang Xia, Esq.

(57) ABSTRACT

Certain aspects direct to systems and methods for platform simulation for development projects of a management controller, such as a baseboard management controller (BMC). The management controller stores a firmware module and a simulator module. The firmware module is supposed to receive output signals from a computing device as the platform, or from one or more devices connected to the platform. The simulator module is a software implemented module used to simulate the platform or the device, by generating the output signals of the platform or the device based on configuration data stored in a data library, and sending the simulated output signals to the firmware module for development and testing purposes.

17 Claims, 10 Drawing Sheets
(4 of 10 Drawing Sheet(s) Filed in Color)

(56) References Cited

U.S. PATENT DOCUMENTS

| | | | |
|---|---|---|---|
| 2010/0205600 A1* | 8/2010 | Tu | G06F 9/455 718/1 |
| 2012/0151475 A1* | 6/2012 | Bealkowski | G06F 9/455 718/1 |
| 2014/0032641 A1* | 1/2014 | Du | H04L 43/0817 709/203 |
| 2014/0195669 A1* | 7/2014 | Bhatia | G06F 11/3006 709/224 |
| 2014/0281449 A1* | 9/2014 | Christopher | G06F 9/4403 713/2 |
| 2014/0289570 A1* | 9/2014 | Lewis | G06F 11/3089 714/43 |
| 2015/0100299 A1* | 4/2015 | Abraham | G06F 8/447 703/22 |
| 2015/0331694 A1* | 11/2015 | Balakrishnan | G06F 3/06 713/2 |
| 2016/0162268 A1* | 6/2016 | Bush | H04L 12/6418 717/178 |

\* cited by examiner

PLATFORM SIMULATION FOR MANAGEMENT CONTROLLER DEVELOPMENT PROJECTS

CROSS-REFERENCE TO RELATED APPLICATIONS

This application relates to co-pending U.S. patent application Ser. No. 15/208,017, entitled "THERMAL SIMULATION FOR MANAGEMENT CONTROLLER DEVELOPMENT PROJECTS" and filed on Jul. 12, 2016. The entire content of the above identified applications are incorporated herein by reference.

FIELD

The present disclosure relates generally to management controller technology, and more particularly to systems and methods for platform simulation for development projects of a management controller, such as a baseboard management controller (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Baseboard management controller (BMC) development projects have dependency on hardware. The cost of pre-production hardware can be very high, and BMC developers have to share available machines.

Therefore, an unaddressed need exists in the art to address the aforementioned deficiencies and inadequacies.

SUMMARY

Certain aspects of the present disclosure direct to a system, which includes a management controller. The management controller includes a processor and a storage device storing computer executable code. The computer executable code includes a firmware module and a simulator module. The firmware module, when executed at the processor, is configured to receive at least one output signal from a computing device or from at least one device connected to the computing device. The simulator module, when executed at the processor, is configured to simulate the computing device or the at least one device connected to the computing device by: generating the at least one output signal based on configuration data of the computing device or the device connected to the computing device; and sending the at least one output signal to the firmware module.

In certain embodiments, the management controller is a baseboard management controller (BMC).

In certain embodiments, the firmware module includes a library module storing a plurality of library programs for the computing device and the at least one device connected to the computing device.

In certain embodiments, the simulator module includes: a data store storing the configuration data of the computing device or the device connected to the computing device; and at least one simulator library sub-module, each configured to simulate one of the at least one device by: receiving a command from one of the library programs of the library module; generating the at least one output signal as a response to the command for the at least one device based on the configuration data stored in the data store; and sending the response to the library module.

In certain embodiments, the simulator module further includes: at least one simulator driver sub-module, each configured to simulate one of the at least one device controlled by a driver by: receiving a command from the driver; generating the at least one output signal as a response to the command for the at least one device based on the configuration data stored in the data library; and sending the response to the driver.

In certain embodiments, the configuration data includes: platform data for the computing device; device data for the at least one device connected to the computing device; and device specific configuration parameters for the at least one device connected to the computing device.

In certain embodiments, each of the device specific configuration parameters is a static value, a random value within a range, a value obtained from one or more patterns, a value derived from a function of another set of variables, a value set by an administrator, a time-based value, or a value picked from a socket server.

In certain embodiments, the at least one device connected to the computing device includes: a voltage sensor; a computer tachometer sensor; an Inter-Integrated Circuit (I2C) device; a power supply unit (PSU); a complex programmable logic device (CPLD); a field-replaceable unit (FRU); a Redundant Array of Independent Disks (RAID) controller; a RAID-on-chip (ROC); a network interface card (NIC); a satellite management controller; an interface connected to the satellite management controller; a system interface; a universal serial bus (USB) interface; and a Host Embedded Controller Interface (HECI).

Certain aspects of the present disclosure direct to a method for platform simulation for development projects of a management controller, including: providing a simulator module in the management controller to simulate a computing device or at least one device connected to the computing device, wherein a firmware module of the management controller is configured to receive the at least one output signal from the computing device or from the at least one device connected to the computing device; generating at least one output signal based on configuration data of the computing device or the device connected to the computing device; and sending the at least one output signal to the firmware module.

In certain embodiments, the management controller is a BMC.

In certain embodiments, the firmware module includes a library module storing a plurality of library programs for the computing device and the at least one device connected to the computing device. In certain embodiments, the simulator module includes: a data store storing the configuration data of the computing device or the device connected to the computing device; and at least one simulator library sub-module, each configured to simulate one of the at least one device by: receiving a command from one of the library programs of the library module; generating the at least one output signal as a response to the command for the at least one device based on the configuration data stored in the data store; and sending the response to the library module. In certain embodiments, the simulator module further includes: at least one simulator driver sub-module, each configured to simulate one of the at least one device controlled by a driver by: receiving a command from the driver; generating the at least one output signal as a response to the command for the at least one device based on the configuration data stored in the data library; and sending the response to the driver.

In certain embodiments, the configuration data includes: platform data for the computing device; device data for the at least one device connected to the computing device; and device specific configuration parameters for the at least one device connected to the computing device. In certain embodiments, each of the device specific configuration parameters is a static value, a random value within a range, a value obtained from one or more patterns, a value derived from a function of another set of variables, a value set by an administrator, a time-based value, or a value picked from a socket server.

In certain embodiments, the at least one device connected to the computing device includes: a voltage sensor; a computer tachometer sensor; an I2C device; a PSU; a CPLD; a FRU; a RAID controller, a ROC; a NIC; a satellite management controller; an interface connected to the satellite management controller; a system interface; a USB interface; and a HECI.

Certain aspects of the present disclosure direct to a non-transitory computer readable medium storing computer executable code, wherein the computer executable code, when executed at a processor of an management controller, is configured to: simulate a computing device or at least one device connected to the computing device, wherein a firmware module of the management controller is configured to receive the at least one output signal from the computing device or from the at least one device connected to the computing device; generate at least one output signal based on configuration data of the computing device or the device connected to the computing device; and send the at least one output signal to the firmware module.

In certain embodiments, the management controller is a BMC.

In certain embodiments, the firmware module includes a library module storing a plurality of library programs for the computing device and the at least one device connected to the computing device. In certain embodiments, the simulator module includes: a data store storing the configuration data of the computing device or the device connected to the computing device; at least one simulator library sub-module, each configured to simulate one of the at least one device by: receiving a command from one of the library programs of the library module; generating the at least one output signal as a response to the command for the at least one device based on the configuration data stored in the data store; and sending the response to the library module; and at least one simulator driver sub-module, each configured to simulate one of the at least one device controlled by a driver by: receiving a command from the driver; generating the at least one output signal as a response to the command for the at least one device based on the configuration data stored in the data library; and sending the response to the driver.

In certain embodiments, the configuration data includes: platform data for the computing device; device data for the at least one device connected to the computing device; and device specific configuration parameters for the at least one device connected to the computing device. In certain embodiments, each of the device specific configuration parameters is a static value, a random value within a range, a value obtained from one or more patterns, a value derived from a function of another set of variables, a value set by an administrator, a time-based value, or a value picked from a socket server.

In certain embodiments, the at least one device connected to the computing device includes: a voltage sensor; a computer tachometer sensor; an I2C device; a PSU; a CPLD; a FRU; a RAID controller, a ROC; a NIC; a satellite management controller; an interface connected to the satellite management controller; a system interface; a USB interface; and a HECI.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

The present disclosure will become more fully understood from the detailed description and the accompanying drawings, wherein.

DETAILED DESCRIPTION

Figure 1:
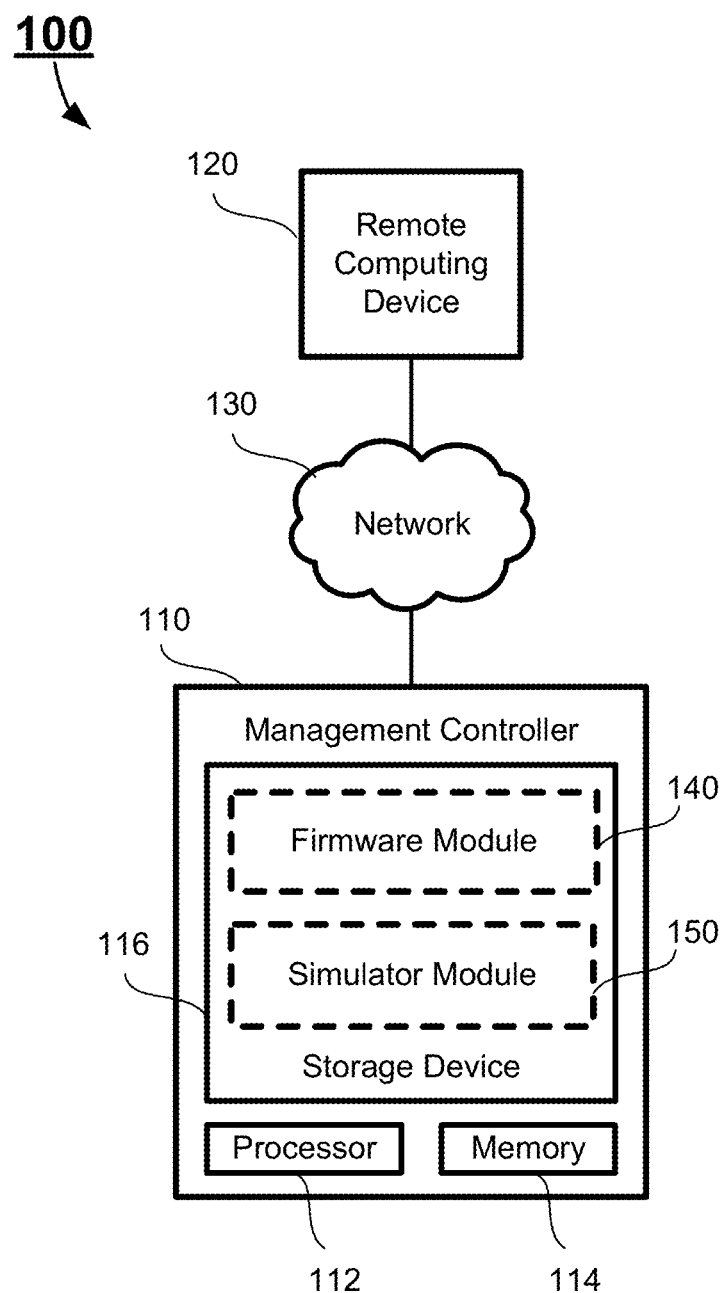
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on the BMC. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for platform simulation for management controller development projects. As discussed above, BMC development projects have dependency on hardware. For example, there are two distinct hardware dependencies for the BMC development projects: (a) a system on a chip (SOC) where the BMC code has to run; and (b) platform specific devices with which the BMC communicates, such as a voltage sensor, a "tach" (i.e., a computer tachometer), a Redundant Array of Independent Disks (RAID) controller, a network interface card (NIC), a satellite management controller, a complex programmable logic device (CPLD), a power supply unit (PSU), or other hardware components or devices manageable by the BMC. However, the cost of pre-production hardware can be very high, and BMC developers have to share available hardware components or machines to perform the development projects. Therefore, the systems and methods for platforms simulation for BMC development can provide a cost effective solution.

FIG. 1 schematically depicts an exemplary system according to certain embodiments of the present disclosure. As shown in FIG. 1, the system 100 includes a management controller 110, which is specifically configured to perform the platform simulation. Optionally, the system 100 may further include a remote computing device 120, which is communicatively connected to the management controller 110 via a network 130, such that an administrator may remotely control the management controller 110 through the remote computing device 120. For example, the remote computing device 130 may allow an administrator/user to input data as part of the simulated data of the simulated devices and/or the simulated platforms to the management controller 110. In certain embodiments, the network 130 may be a wired or wireless network, and may be of various forms. Examples of the network 130 may include, but is not limited to, a local area network (LAN), a wide area network (WAN) including the Internet, or any other type of networks.

The management controller 110 is a specialized microcontroller configured to manage the platform hardware devices and system management software components. In certain embodiments, the management controller 110 may be a BMC used for baseboard management purposes. Alternatively, the management controller 110 may be a management controller for other purposes, such as chassis management, rack management, virtual machine management or other type of management purposes. In certain embodiments, the management controller 110 may be an embedded controller on the motherboard or the baseboard of a computing device, and different types of sensors can be built into the computing device. The management controller 110 may read these sensors to obtain parameters such as temperature, cooling fan speeds, power status, operating system (OS) status, etc. The management controller 110 may monitor the sensors and send alerts to a system administrator at the remote computing device 120 via the network 130 if any of the parameters do not stay within preset limits, indicating a potential failure of the system. The administrator may also remotely communicate with the management controller 110 from the remote computing device 120 to take some corrective action, such as resetting or power cycling the system to get a hung OS running again. Examples of the features that the management controller 110 may monitor include: sensor monitoring, firmware update of the PSU, the CPLD, or other out-of-band (OOB) devices, protocols such as Management Component Transport Protocol (MCTP), interfacing with satellite management controllers or other devices behind the satellite management controllers, interface channels such as the keyboard controller style (KCS) interface or other system interfaces, the universal serial bus (USB) interface and the Host Embedded Controller Interface (HECI), and integrated behavior such as PSU power based on specific component composition and system load. Further, other features of the management controller 110 may include: system event log (SEL), platform event filtering (PEF), boundary conditions, invalid values from the devices, unexpected size of data from the devices, delays from the devices, and unexpected restart of the devices, losing the state of the machines in transactions.

As shown in FIG. 1, the management controller 110 includes a processor 112, a memory 114, and a storage device 116. Further, the management controller 110 may include other hardware components and software components (not shown) to perform its corresponding tasks. For example, the management controller 110 may include a network interface, such as a network interface card (NIC), which is used to connect the management controller 110 to the network 130. Other examples of these hardware and software components of the management controller 110 may include, but not limited to, other required memory, interfaces, buses, Input/Output (I/O) modules and peripheral devices.

The processor 112 is configured to control operation of the management controller 110. In certain embodiments, the processor 112 may be a central processing unit (CPU). The processor 112 can execute any computer executable code or instructions, such as the firmware module 140 and the simulator module 150 of the management controller 110 or other applications and instructions of the BMC 110. In certain embodiments, the management controller 110 may run on more than one processor, such as two processors, four processors, eight processors, or any suitable number of processors.

The memory 114 can be a volatile memory, such as the random-access memory (RAM), for storing the data and information during the operation of the management controller 110. In certain embodiments, the memory 114 may be a volatile memory array. In certain embodiments, the management controller 110 may run on more than one memory 114.

The storage device 116 is a non-volatile data storage media for storing computer executable code or instructions for performing the operation of the management controller 110. In certain embodiments, the computer executable code or instructions of the management controller 110 may be implemented as one or more application programs or modules. Examples of the storage device 116 may include non-volatile memory such as flash memory, memory cards, USB drives, hard drives, floppy disks, optical drives, or any other types of data storage devices. In certain embodiments, the management controller 110 may have multiple storage devices 116, which may be identical storage devices or different types of storage devices, and the firmware module 140, the simulator module 150, and other applications of the management controller 110 may be stored in one or more of the storage devices 116 of the management controller 110.

As shown in FIG. 1, the applications stored in the storage device 116 include the firmware module 140 and the simulator module 150. As discussed above, each of the firmware module 140 and the simulator module 150 may be formed by the computer executable code or instructions executable at the processor 112. In certain embodiments, each of the firmware module 140 and the simulator module 150 may further include sub-modules. Alternatively, in certain embodiments, the firmware module 140 and the simulator module 150 may be combined to form a single module. In certain embodiments, the storage device 116 may store other applications independent from the firmware module 140 and the simulator module 150.

The firmware module 140 may include a plurality of modules or sub-modules, which may respectively be implemented by computer executable codes or instructions to collectively form the firmware module 140. In certain embodiments, the firmware module 140 may include applications for monitoring the various features of the computing device, which the management controller 110 is supposed to be connected to. Examples of the features of the computing device may include, without being limited to, sensors, firmware updates, satellite control monitoring, bridging, interfacing, RAID management, device management, field-replaceable unit (FRU) commands, or any other features that may be managed or monitored by the management controller 110. In operation, the firmware module 140 may receive the corresponding data from the features of the computing device being monitored (or from the simulator module 150). In certain embodiments, different firmware modules or sub-modules of the firmware module 140 may respectively receive the corresponding data simultaneously. In certain embodiments, the firmware module 140 may further generate test result based on the data received, and send the test result back to the corresponding features of the computing device being monitored (or to the simulator module 150). In certain embodiments, the firmware module 140 may include other applications necessary for the operation of the management controller 110.

The simulator module 150 is configured to simulate the features and devices being communicating to and monitored by the management controller 110 and the platforms used by the devices to communicate with management controller 110. As discussed above, the management controller 110 may be used to monitor and manage certain features and/or devices of the computing device. For example, the features and/or devices being monitored and managed by the management controller 110 may include computer platforms and the devices and features of the computer platforms. In the management controller development projects, there may be required tests to be performed for each of different platforms, different devices, and different device specific configuration parameters for each device. Generally, in the management controller development projects, the SOC vendors may provide development boards (also referred to as the evaluation boards or "eval boards"), which may be used in a laboratory environment to perform development and testing purposes. In some cases, older computer platforms may be available as needed and used for new development. However, the dependency on the hardware components may be about the board/platform specific features. For example, the voltage sensors, tach sensors, and some of the Inter-Integrated Circuit (I2C) devices may be simple hardware components that provide value on the I2C buses. Some of the I2C devices, such as other management controllers, PSU devices on PMBUS, the I2C interface for the RAID cards or the network cards, may perform command processing. In certain embodiments, these features and devices to be tested may be simulated by the simulator module 150.

In certain embodiments, the simulator module 150 may include one or more simulation files, which contains the detailed information of the features and devices being simulated. In certain embodiments, the simulation files may include, without being limited to: (1) one or more platform data files, each providing the detailed information of the type of the platform device and an address; (2) one or more device data files (which may be used across projects for different platforms), each providing the detailed information of the type of the device and the types of commands and responses of the device; and (3) one or more device specific configuration parameter files, each providing the specific configuration applicable for the device, including the method of generating the response.

In certain embodiments, the simulator module 150 may obtain data typically generated by the simulated features and/or devices, and send the data to the firmware module 140, so as to test and develop the management controller 110 without dependency on physical devices. In certain embodiments, the simulator module 150 may further receive the response from the firmware module 140, and then obtain further data to be sent to the firmware module 140 based on the response from the firmware 140. In certain embodiments, the simulator module 150 may store platform data files providing platform details of the devices such as the type, the bus address and the device address of the devices, device data files correspondingly providing details of each device such as the type of command and responses of each device, and device specific configuration parameter files correspondingly providing specific configuration applicable for each of the devices, including the method of generating the response of each of the devices. The simulator module 150 may generate the simulated data based on the platform data files, device data files, and device specific configuration parameter files.

Figure 2:
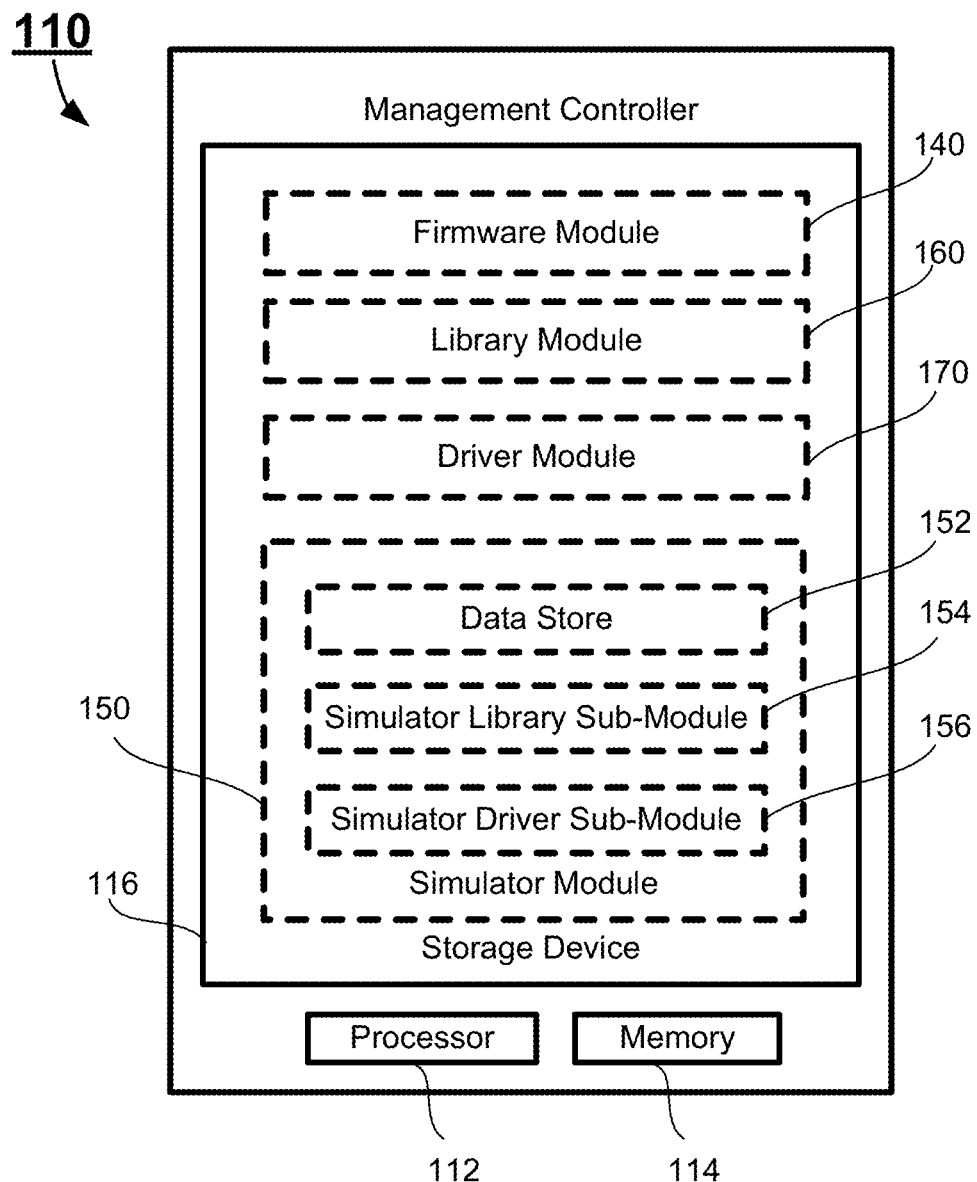
FIG. 2 schematically depicts a management controller of the system according to certain embodiments of the present disclosure.

FIG. 2 schematically depicts a management controller of the system according to certain embodiments of the present disclosure. As shown in FIG. 2, in addition to the firmware module 140 and the simulator module 150, the applications stored in the storage device 116 further include a library module 160 and a driver module 170. Further, the simulator module 150 of the management controller 110 includes a plurality of sub-modules, such as a data store 152, a simulator library sub-module 154, and a simulator driver sub-module 156.

The library module 160 is a module storing a plurality of library programs used for development purposes. In certain embodiments, the library programs of the library module 160 may include configuration information of the management controller 110, documentation, help data, message templates, pre-written code and subroutines, classes, values or type specifications, or any other data necessary for the development projects. Each of the library programs of the library module 160 may correspond to one or more actions for communicating with the features, such as hardware or software components, being monitored by the management controller 110. For example, some of the library programs of the library module 160 may be in charge of the read/write process to certain features or devices. In certain embodiments, the library programs of the library module 160 may be a part of the firmware module 140, or may be separate from the firmware module 160. It should be noted that, although FIG. 2 shows the library module 160 as a collective module of the library programs, each library program may be independent and separate from one another, and may be stored in different locations and executed independently in different threads.

The driver module 170 is a module storing a plurality of drivers. In certain embodiments, the drivers may be a part of the firmware module 140, or may be separate from the firmware module 140. Each of the drivers of the driver module 160 may correspond to one of the features, such as hardware or software components, being monitored by the management controller 110. It should be noted that, although FIG. 2 shows the driver module 160 as a collective module of the drivers, each driver may be independent and separate from one another. In operation, the drivers are configured to control the corresponding feature, and to receive and process data from the corresponding feature.

The data store 152 is a database which stores configuration data of the computing device or the device connected to the computing device being simulated by the simulator module 150. In certain embodiments, the data store 152 may be modified to support the read/write processes by the library programs of the library module 160. In certain embodiments, the configuration data may include the platform data files, the device data files, and the device specific configuration parameter files. In certain embodiments, the device specific configuration parameter files may contain configuration parameters of the devices. In certain embodiments, the configuration parameters of the devices may include device values, and each of the device values may be a static value or a random value within a range. In certain embodiments, the device values may be obtained from patterns, or derived from a function of another set of variables. In certain embodiments, the device values may be values set by administrators/users through the remote computing device 120, time-based values based on different time of a day, or values picked from a socket server located locally in the management controller 110 or from a remote machine (which may be the remote computing device 120, or may be another remote computer not shown in the figures). For example, values of voltage sensor at the time of power on in a dynamic manner can be changed by an administrator/user through the remote computing device 120 to aid studying of the event generation and the need for the masking of the events in the initializing period.

The simulator library sub-module 154 is a sub-module to simulate the command and/or response of the computing device or the devices connected to the devices. In certain embodiments, the simulation of the simulator library sub-module 154 is performed based on the configuration data stored in the data store 152. In certain embodiments, in response to an action or a command from the library module 160 that is supposed to be sent to certain devices, the simulator library sub-module 154 may simulate a corresponding response of the devices based on the corresponding platform data files, device data files, and device specific configuration parameter files for the devices stored in the data store 152. For example, the simulator library sub-module 154 may simulate application program interfaces (APIs) of a particular device, such as a read/write process, by referring to the device address (e.g., bus address and device address of the device on the bus) contained in the platform data files for the device, and simulate a response as needed by the device by referring to the configuration parameters of the device contained in the device specific configuration parameter files for the device. In response to generating the simulated data, the simulator library sub-module 154 sends the simulated data to the firmware module 140 through the library module 160 for BMC testing and developing. In certain embodiments, the simulator library sub-module 154 may simulate for intelligent devices such as satellite controllers, PSUs, NIC, RAID, CPLD by referring to the data library 152 or to the socket server. In certain embodiments, the simulator library sub-module 154 may simulate devices behind satellite controllers, which are accessed by bridging, by referring to the data library 152 for bridge command for the devices and execute the command. In certain embodiments, more than one simulator library sub-module 154 may co-exist to simulate the different intelligent devices.

The simulator driver sub-module 156 may simulate the command and/or response to/from the drivers of the driver module 170. As discussed above, the drivers of the driver module 160 are configured to receive and process data from the corresponding hardware, and send the processed data to the firmware 170. In certain embodiments, the library programs of the library module 160 may use the drivers of the driver module 170 to interact with the corresponding hardware. In certain embodiments, the simulator driver sub-module 156 may simulate data from part or all of the hardware controlled by the drivers, and send the simulated data to the corresponding driver in the driver module 160 for processing. For example, the driver module 170 may include one or more existing drivers for a certain device. In this case, the simulator driver sub-module 156 may simulate a driver, which can register one or more handlers with the existing drivers for the device, and the existing drivers may check for registration to determine whether the drivers should be handled by the simulator driver sub-module 156 (i.e., the simulated driver). This will allow for easier separation of the simulator codes for exclusion when a regular image of the management controller 110 is prepared. In certain embodiments, more than one simulator driver sub-module 156 may co-exist to simulate the different intelligent devices.

In operation, each of the sub-modules of the simulator module 150 may be independently executed in different threads such that each of the sub-modules may independently simulate the corresponding feature. In certain embodiments, the data library 152 may be modified to support the read/write processes by the sub-modules of the simulator module 150. For example, for a specific I2C device on a bus X and address Y, the sub-module corresponding to the I2C device will be coded such that the read/write process to the I2C device will reference to the configuration data stored in the data library 152 that corresponds to the I2C device. Thus, in the simulating process, the sub-module will retrieve the configuration data, and then generate a response as needed for the simulated I2C device based on the configuration data.

Figure 3A:
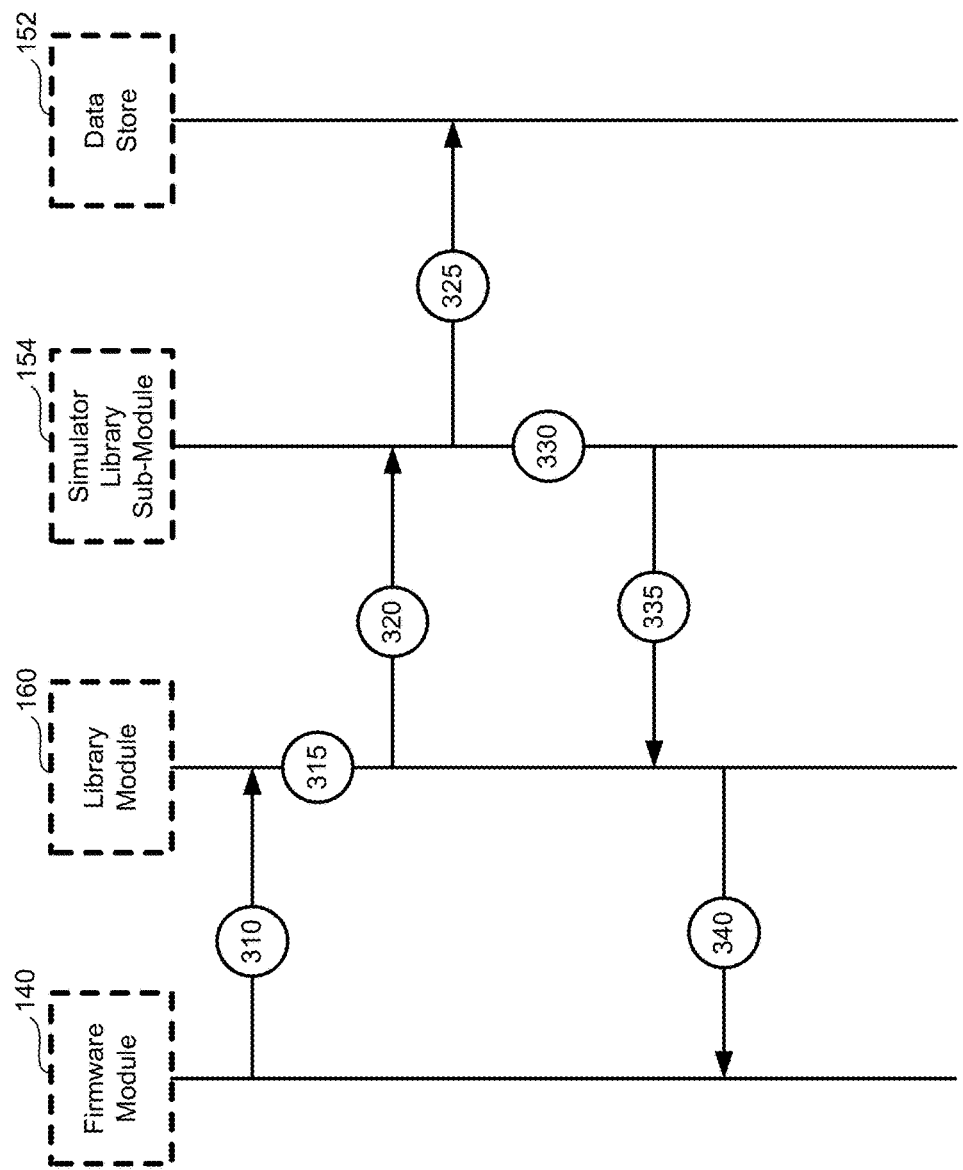
FIG. 3A depicts operation of the simulator library sub-module of a simulator module of a management controller of the system according to certain embodiments of the present disclosure.

FIG. 3A depicts operation of the simulator library sub-module of a simulator module of a management controller of the system according to certain embodiments of the present disclosure. As described above, the simulator library sub-module 154 simulates the command and/or response of the computing device or the devices connected to the devices. When the simulator library sub-module 154 is used to simulate a certain device, any command being intended for the device will be forwarded to the simulator library sub-module 154. As shown in FIG. 3A, when the management controller 110 intends to send a command to the device, at procedure 310, the firmware module 140 communicates with the library module 160 to select a corresponding library program in the library module 160 for the command. At procedure 315, the library program of the library module 160 is selected and executed to generate the command for the device. Since the device is now simulated by the simulator library sub-module 154, at procedure 320, the command is sent to the simulator library sub-module 154. In response to the command, at procedure 325, the simulator library sub-module 154 retrieves the corresponding configuration data of the device from the data store 152. The configuration data of the device may include one or more device data files and one or more device specific configuration parameter files. At procedure 330, the simulator library sub-module 154 generates a response to the command based on the configuration data of the device retrieved from the data store 152. At procedure 335, the simulator library sub-module 154 sends the response back to the library module 160. At procedure 340, the library program of the library module 160 sends the response back to firmware module 140.

Figure 3B:
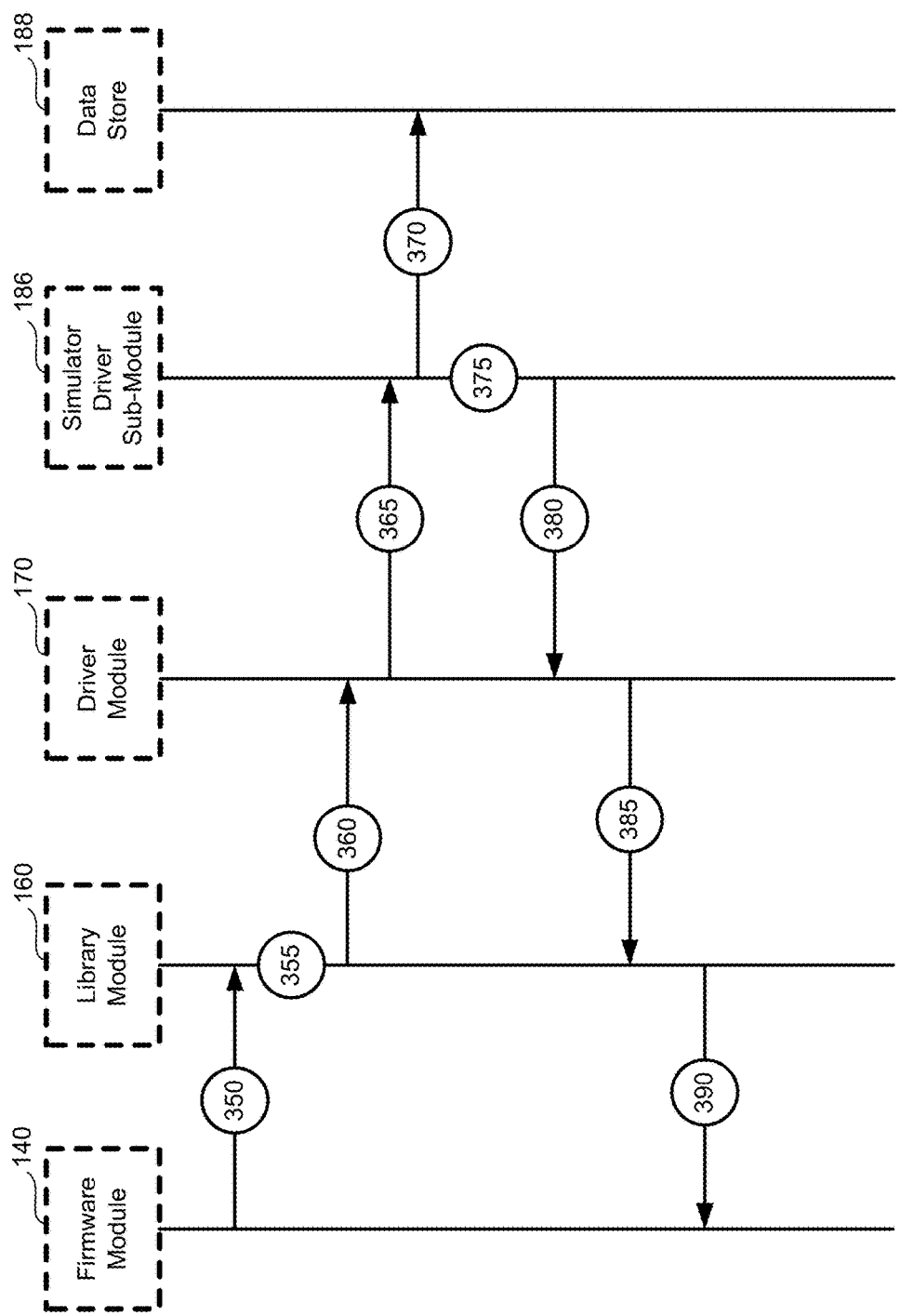
FIG. 3B depicts operation of the simulator driver sub-module of a simulator module of a management controller of the system according to certain embodiments of the present disclosure.

FIG. 3B depicts operation of the simulator driver sub-module of a simulator module of a management controller of the system according to certain embodiments of the present disclosure. As described above, the simulator driver sub-module 156 simulates the command and/or response to/from the drivers of the driver module 170. When the simulator driver sub-module 156 is used to simulate a certain device controlled by the driver, any command being intended for the device will be forwarded to the simulator driver sub-module 156. As shown in FIG. 3B, when the management controller 110 intends to send a command to the device, at procedure 350, the firmware module 140 communicates with the library module 160 to select a corresponding library program in the library module 160 for the command. At procedure 355, the library program of the library module 160 is selected and executed to generate the command for the device. Since the device is controlled by a driver of the driver module 170, at procedure 360, the library program of the library module 160 sends the command to the driver of the driver module 170. Since the device is now simulated by the simulator driver sub-module 156, at procedure 365, the driver of the driver module 170 sends the command to the. In response to the command, at procedure 370, the simulator driver sub-module 156 retrieves the corresponding configuration data of the device from the data store 152. The configuration data of the device may include one or more device data files and one or more device specific configuration parameter files. At procedure 375, the simulator driver sub-module 156 generates a response to the command based on the configuration data of the device retrieved from the data store 152. At procedure 380, the simulator driver sub-module 156 sends the response back to the driver of the driver module 170. At procedure 385, the driver of the driver module 170 forwards the response back to the library module 160. At procedure 390, the library program of the library module 160 sends the response back to the firmware module 140.

In certain embodiments, the simulator module 150 may include more than one of the simulator library sub-module 154 and/or more than one of the simulator driver sub-module 156, based on the number of the features and devices to be simulated and tested. For example, the features and/or devices being simulated by the sub-modules may include, without being limited to, a voltage sensor; a computer tachometer sensor; an Inter-Integrated Circuit (I2C) device; a PSU; a CPLD; a FSU; a RAID controller; a RAID-on-chip (ROC); a NIC; a satellite management controller; an interface connected to the satellite management controller; a system interface; a USB interface; and a HECI.

Figure 4:
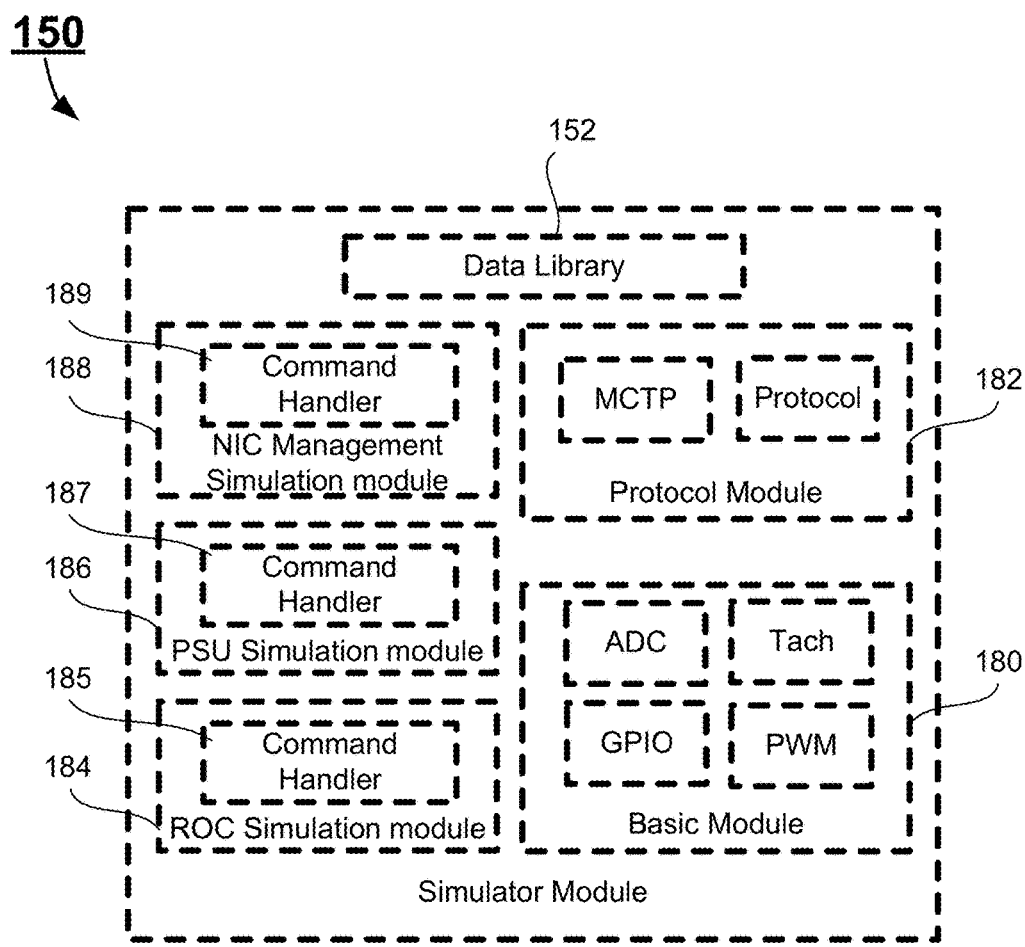
FIG. 4 schematically depicts the sub-modules of a simulator module of a management controller of the system according to certain embodiments of the present disclosure.

FIG. 4 schematically depicts the sub-modules of a simulator module of a management controller of the system according to certain embodiments of the present disclosure. As shown in FIG. 3, the simulator module 150 includes a plurality of sub-modules, including a basic module 180, a protocol module 182, a ROC simulation module 184, a PSU simulation module 186, and a NIC management simulation module 188. It should be noted that, although the term "module" is used for the basic module 180, the protocol module 182, the ROC simulation module 184, the PSU simulation module 186 and the NIC management simulation module 188, they are sub-modules of the simulator module 150. In certain embodiments, each of the sub-modules may further include sub-modules or units. In certain embodiments, some of the sub-modules, such as the ROC simulation module 182, the PSU simulation module 184, and the NIC management simulation module 186, may include a command handler, which is used to simulate the commands and responses of the devices simulated by the sub-modules. The command handler receives a command and brokers a result from the appropriate aggregate. The result may be either a successful application of the command, or an exception.

The basic module 180 is a collective module for simulating basic features of the platform and devices, such as analog-to-digital converter (ADC), tachmeter (Tach), pulse-width modulation (PWM), general-purpose input/output (GPIO) and so on. In certain embodiments, each of the basic features being simulated may have a separate sub-module. The values of the basic modules can be configured by a user (e.g., the administrator), changed by the user through the remote computing device 120, and/or programmed to logically generate at run time.

The protocol module 182 is a collective module for simulating one or more protocols, such as the exemplary Management Component Transport Protocol (MCTP) and other protocols. In certain embodiments, each of the protocols being used may have a separate sub-module as the corresponding protocol.

The ROC simulation module 184 is configured to simulate ROC commands communicating to the management controller 110. Traditionally, when the management controller 110 is a BMC SOC, the ROC may be connected to the BMC through I2C bus and use command/response mechanism to communicate with the BMC. The ROC simulation module 184 may include a command handler 185, which is configured to simulate the commands and responses of the ROC. Specifically, the simulated command/response may be generated on logical basis, for example, a simulated response for power consumption can be varied by simple logic, such as based on user-configured values inputted by remote computing device 120, or based on an integrated simulation of the system based on parameters such as host power status, RAID configuration, I/O rate, and the number and the configuration of the drives.

The PSU simulation module 186 is configured to simulate PSU commands communicating to the management controller 110. Traditionally, when the management controller 110 is a BMC, a PSU device may be connected to the I2C bus of the BMC, and the BMC may communicate with the PSU by using Power Management Bus (PMBus) protocol in a command/response manner. Alternately, commands other than PMBus that are specified by Original Equipment Manufacturer (OEM) project specifications may be employed by the BMC to communicate with the PSU. In certain embodiments, the PSU simulation module 186 may employ the command handler 187 to simulate the PMBus command as well as other OEM commands to communicate with the BMS for monitoring purpose. The simulated commands may vary according to the conditions including host power on status, other devices that are present, such as RAID cards and Mezzanine Cards, the number of the other device that are present, CPU utilization, number of the PSUs present, the AC input status of each of the PSUs, and the operating mode of the PSUs, such as cold redundancy.

The NIC management simulation module 188 is configured to simulate NIC commands communicating to the management controller 110. Generally, the NIC utilizes a Network Controller Sideband Interface (NCSI). Traditionally, when the management controller 110 is a BMC, the sideband of a NIC device is connected to BMC SOC I2C bus or SOC Reduced Media Independent Interface (RMII), and BMC communicate with NIC device through NCSI in a command/response manner. Alternately, mechanism other than NCSI that are specified by OEM project specifications may be employed by the BMC to communicate with the NIC device. In certain embodiments, the NIC management simulation module 188 may employ a command handler 189 to simulate the NCSI command/response as well as other OEM command/response to communicate with the BMS. Specifically, the simulated command/response may be generated on logical basis, for example, a simulated response for power consumption can be varied by simple logic, such as based on user-configured values inputted by remote computing device 120, or based on an integrated simulation of the system based on parameters such as host power on status, link status, and I/O rate.

In certain embodiments, a framework may be defined such that suppliers of new hardware components or modules of the management controller 110 may write the simulation code, while the team for the development projects of the management controller 110 may focus on the feature development based on the new hardware. In certain embodiments, the framework may also include new interfaces (e.g., a newly added hypothetical bus named the XYZ bus), or new devices (e.g., a newly added hypothetical device named the ABC card) of the SOC from hardware providers and partners.

As described above, the simulator module 150 may generate one or more output signals for the simulated device. For example, in certain embodiments, the device being simulated may be voltage sensors, and the output signals may be voltage signals. In certain embodiments, the device being simulated may be one or more CPUs, and the output signals may be power consumptions of the CPUs. In certain embodiments, the device being simulated may be a PSU, and the output signals may be power consumptions of the CPUs. For each of the devices being simulated by the simulator module 150, the output signals may be obtained from the actual output by the actual devices of a computing device, and used in the simulator module 150 for development purposes. In the following examples as shown in FIGS. 5-8, all of the output signals are obtained from devices of an actual computing device as a host computer. For each of the diagrams, the X axis of the diagram is the time, and the Y axis of the diagram is the voltage value. To obtain the output signals for testing purposes, at the time of about 200, the computing device (i.e., the host) is powered off, but the AUX voltages continue to be available.

Figure 5:
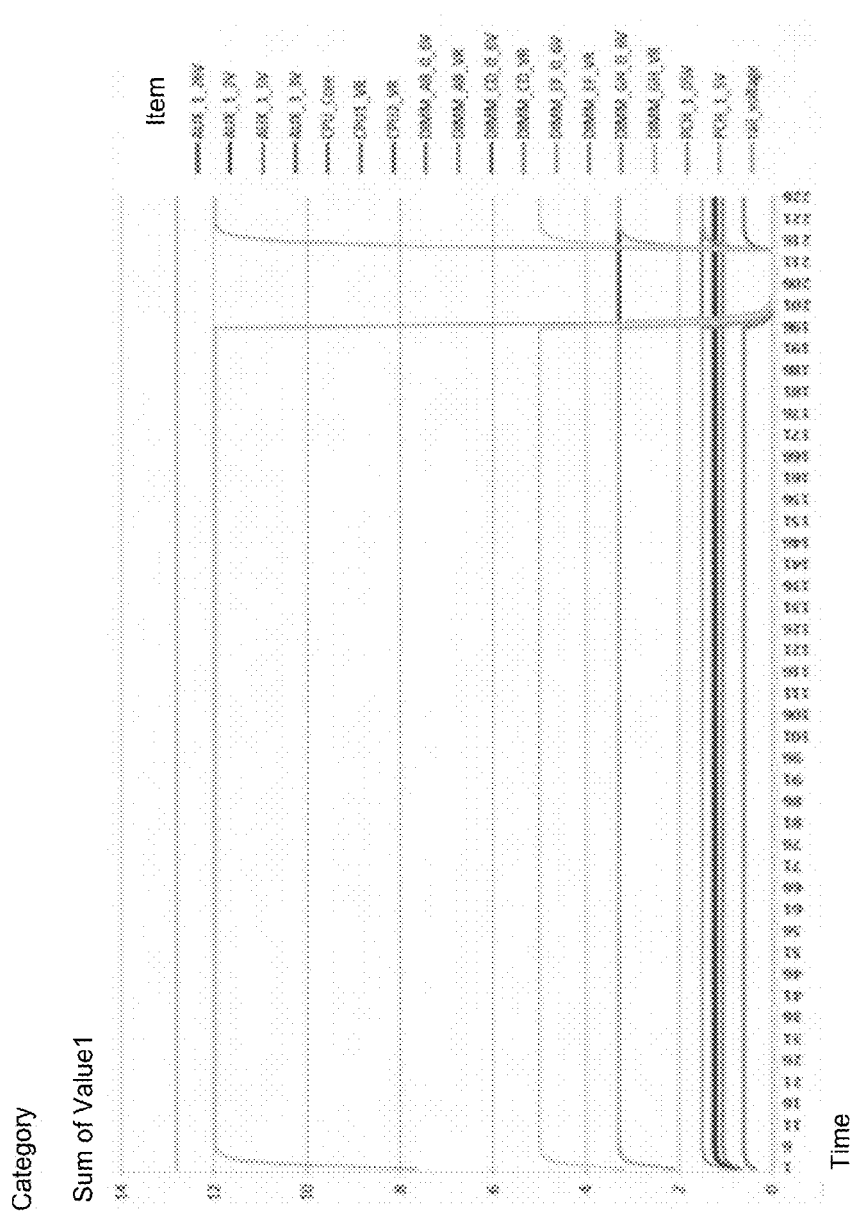
FIG. 5 depicts a diagram of voltage signals according to certain embodiments of the present disclosure.

FIG. 5 depicts a diagram of voltage signals according to certain embodiments of the present disclosure, where different voltage signals generated by different sensors may be simulated by the simulator module 150. The sensors being simulated may be located in different places of the computing device, such as the AUX, the CPUs, the DIMMs, the PCH, and the rail. As described above, for testing purposes, at the time of about 200, the computing device (i.e., the host) is powered off, but the AUX voltages continue to be available. When the simulator module 150 generates the voltage signals as the output, the engineer of the development project of the management controller 110 may use the voltage signals to perform tests on the firmware module 140 of the management controller 110.

Figure 6:
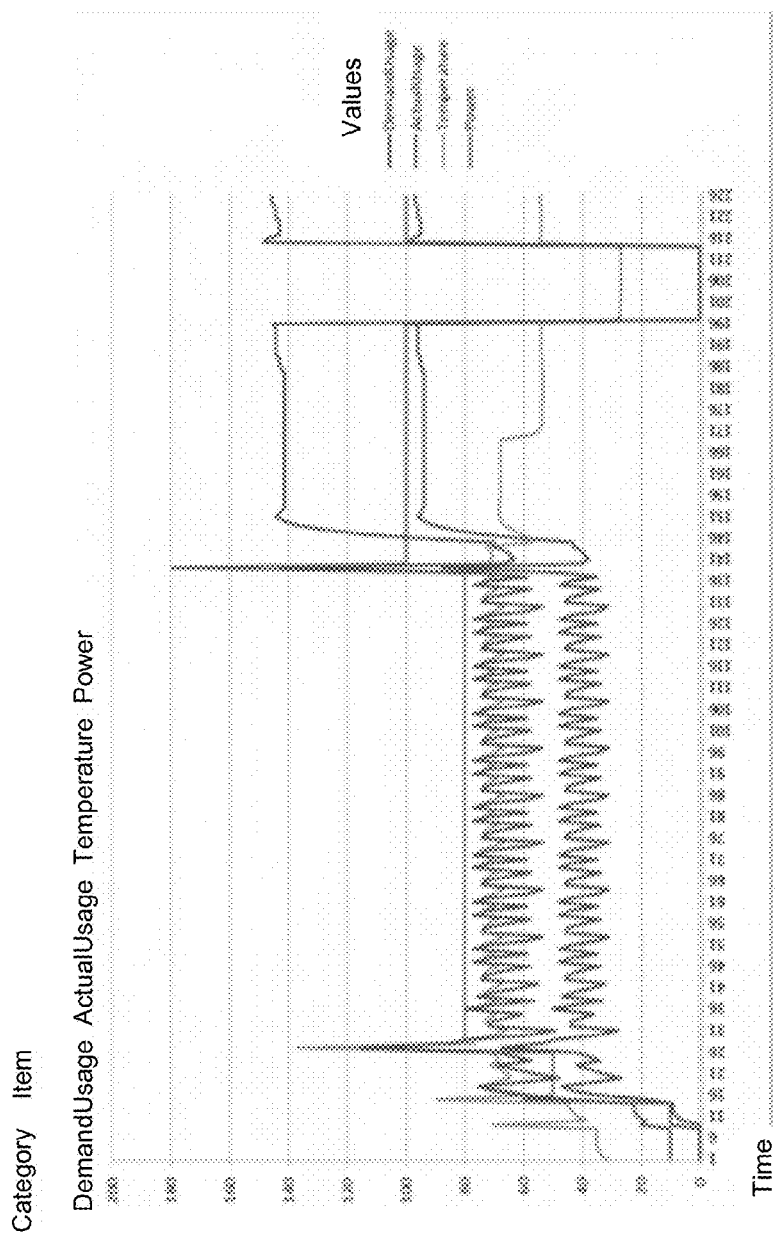
FIG. 6 depicts a diagram of power consumption of a central processing unit (CPU) according to certain embodiments of the present disclosure.
Figure 7:
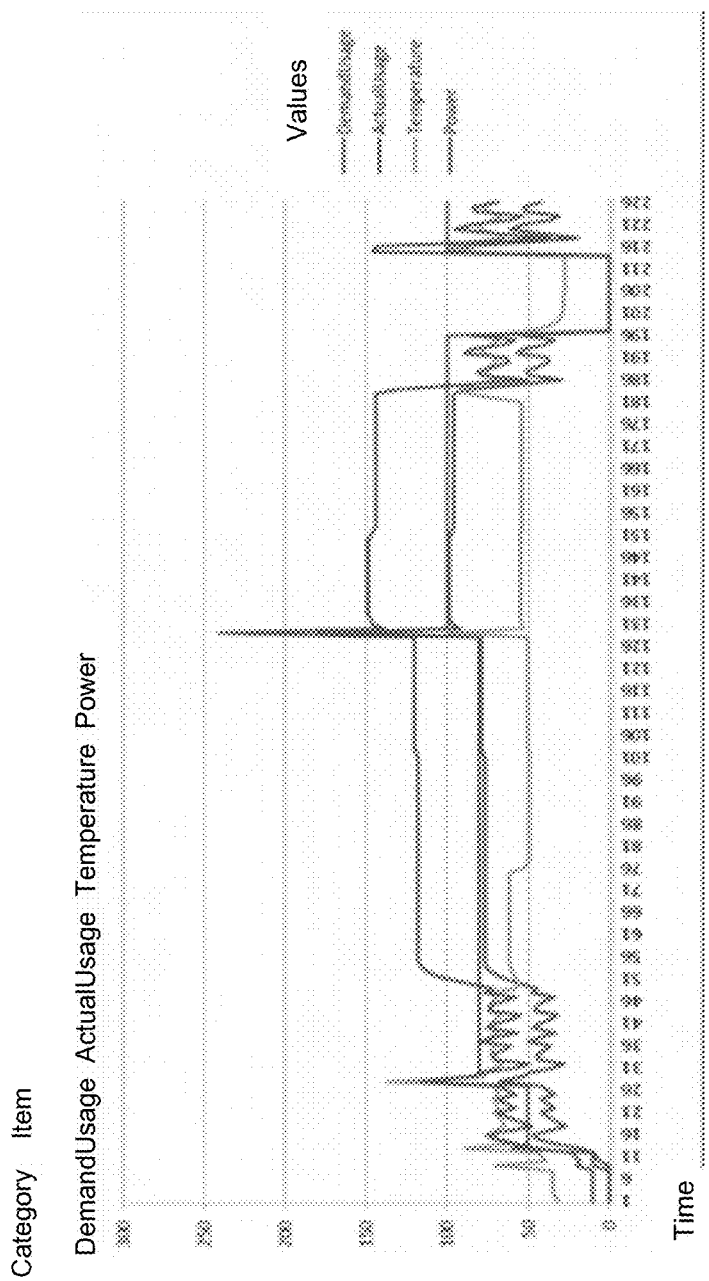
FIG. 7 depicts a diagram of power consumption of a central processing unit (CPU) according to certain embodiments of the present disclosure.

FIGS. 6 and 7 respectively depict diagrams of power consumption of two different CPUs according to certain embodiments of the present disclosure. Specifically, the data as shown in the diagrams of FIGS. 6 and 7 may be obtained by a computing device having two CPUs (e.g., a CPU 0 and a CPU 1). As described above, for testing purposes, at the time of about 200, the computing device (i.e., the host) is powered off, but the AUX voltages continue to be available. In certain embodiments, when the simulator module 150 generates the power consumption signals of the CPUs as the output, the engineer of the development project of the management controller 110 may use the power consumption signals to perform tests on the firmware module 140 of the management controller 110.

Figure 8:
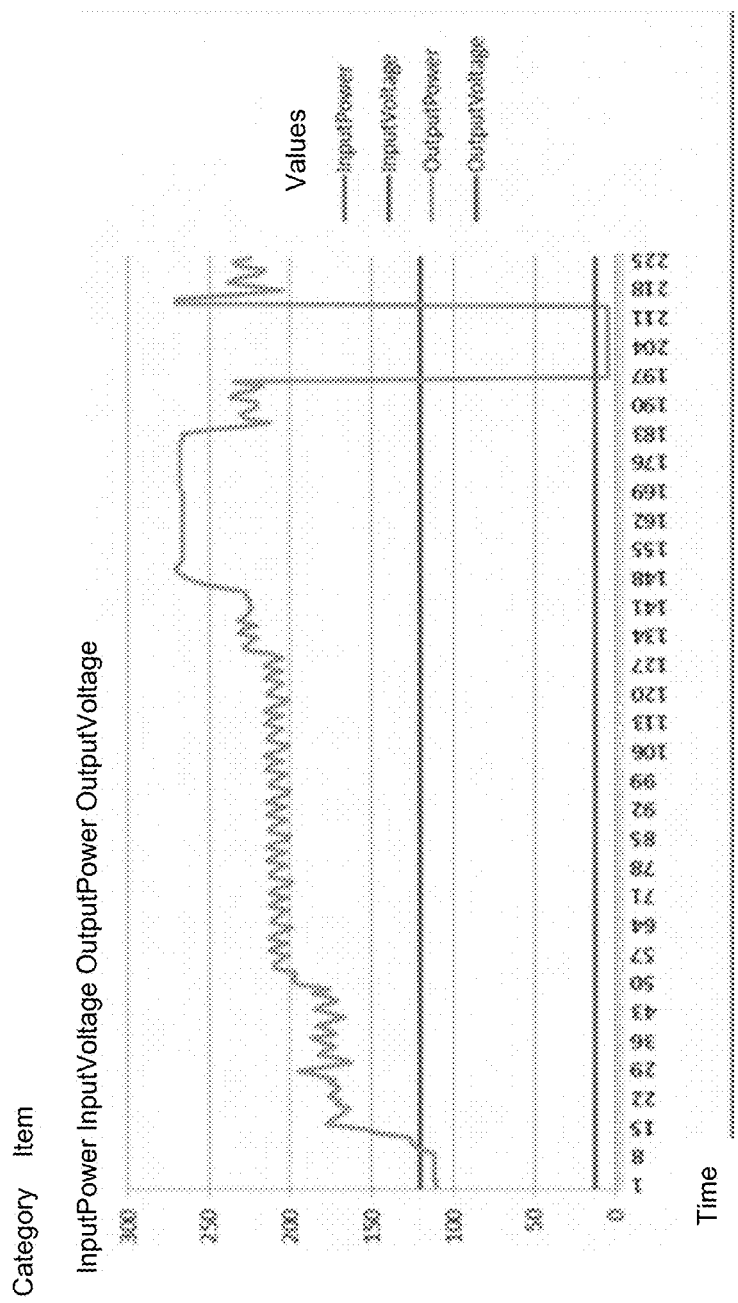
FIG. 8 depicts a diagram of output signals of a power supply unit (PSU) according to certain embodiments of the present disclosure.

FIG. 8 depicts a diagram of output signals of a PSU according to certain embodiments of the present disclosure. As described above, for testing purposes, at the time of about 200, the computing device (i.e., the host) is powered off, but the AUX voltages continue to be available. In certain embodiments, when the simulator module 150 generates the power output signals of the PSU as the output, the engineer of the development project of the management controller 110 may use the power output signals to perform tests on the firmware module 140 of the management controller 110.

Figure 9:
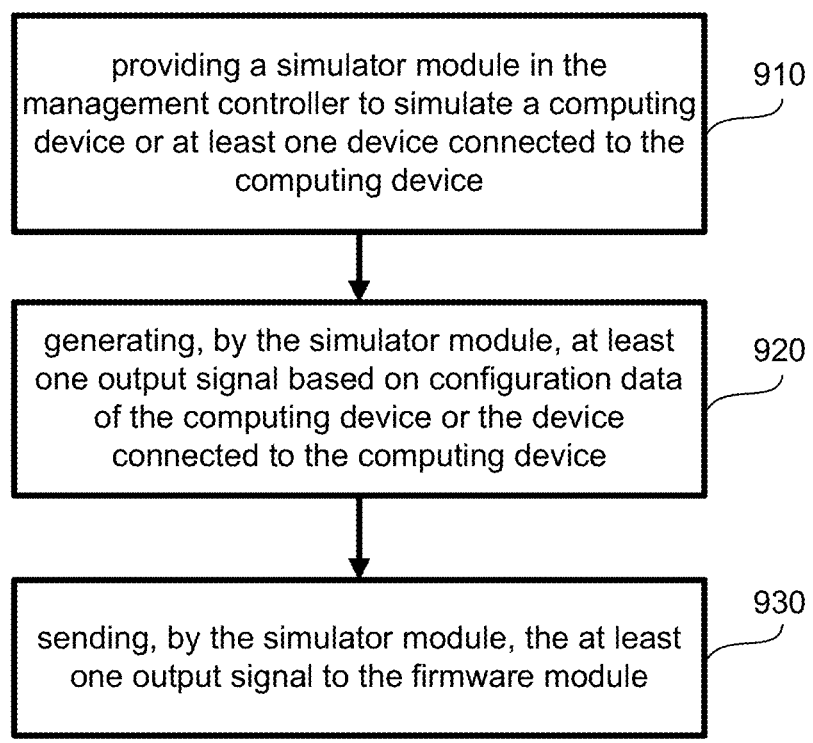
FIG. 9 depicts a flowchart showing a method for platform simulation for development projects of a management controller according to certain embodiments of the present disclosure.

A further aspect of the present disclosure is directed to a method for platform simulation for development projects of a management controller. FIG. 9 depicts a flowchart showing a method for platform simulation for development projects of a management controller according to certain embodiments of the present disclosure. In certain embodiments, the method as shown in FIG. 9 may be implemented on a system as shown in FIG. 1. It should be particularly noted that the sequence of the procedures as described in the flowchart as shown in FIG. 9 may vary, and is thus not intended to limit the disclosure thereof.

As shown in FIG. 9, at procedure 910, a simulator module 150 is provided in the management controller 110 to simulate a computing device or at least one device connected to the computing device. Specifically, the firmware module 140 of the management controller 110 is configured to receive at least one output signal from the computing device or from the at least one device connected to the computing device.

At procedure 920, the simulator module 150 generates the at least one output signal based on configuration data of the computing device or the device connected to the computing device. As discussed above, the configuration data may be stored in the data store 152. In certain embodiments, the simulator module 150 may include one or more sub-modules to simulate one or more devices, and each of the sub-modules may be executed in a different thread such that the sub-modules may run simultaneously. Examples of the sub-modules may include the simulator library sub-module 154 and simulator driver sub-module 156.

At procedure 930, once the simulator module 150 generates the output signal, the simulator module 150 sends the at least one output signal to the firmware module 140. In certain embodiments, the firmware module 140 may send, through the library module 160 and/or the driver module 170, commands to the sub-modules of the simulator module 150, and each of the sub-modules of the simulator module 150 may return the output signal as the response to each of the commands back to the library module 160 and/or the driver module 170.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 116 of the management controller 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a management controller, comprising a processor and a storage device storing computer executable code, wherein the management controller is a baseboard management controller (BMC), and wherein the computer executable code comprises:
a firmware module for the management controller; and
a simulator module configured to simulate a simulated host computing device for the management controller and at least one simulated device connected to the simulated host computing device;
wherein the firmware module and the simulator module are both stored in the storage device of the management controller and executable at the processor of the management controller;
wherein the firmware module, when executed at the processor, is configured to receive at least one output signal from the simulated host computing device or from the at least one simulated device connected to the simulated host computing device, and to perform a test using the at least one output signal;
wherein the simulator module, when executed at the processor, is configured to simulate the simulated host computing device and the at least one simulated device connected to the simulated host computing device by:
generating the at least one output signal based on configuration data of the simulated host computing device or the at least one simulated device connected to the simulated host computing device; and
sending the at least one output signal to the firmware module.

2. The system as claimed in claim 1, wherein the firmware module comprises a library module storing a plurality of library programs for the simulated host computing device and the at least one simulated device connected to the simulated host computing device.

3. The system as claimed in claim 2, wherein the simulator module comprises:
a data store storing the configuration data of the simulated host computing device or the simulated device connected to the simulated host computing device; and
at least one simulator library sub-module, each configured to simulate one of the at least one simulated device by:
receiving a first command from one of the library programs of the library module;
generating the at least one output signal as a first response to the first command for the at least one device based on the configuration data stored in the data store; and
sending the first response to the library module.

4. The system as claimed in claim 3, wherein the simulator module further comprises:
at least one simulator driver sub-module, each configured to simulate one of the at least one simulated device controlled by a driver by:
receiving a second command from the driver;
generating the at least one output signal as a second response to the second command for the at least one simulated device based on the configuration data stored in the data library; and
sending the second response to the driver.

5. The system as claimed in claim 1, wherein the configuration data comprises:
platform data for the simulated host computing device;
device data for the at least one simulated device connected to the simulated host computing device; and
device specific configuration parameters for the at least one simulated device connected to the simulated host computing device.

6. The system as claimed in claim 5, wherein each of the device specific configuration parameters is a static value, a random value within a range, a value obtained from one or more patterns, a value derived from a function of another set of variables, a value set by an administrator, a time-based value, or a value picked from a socket server.

7. The system as claimed in claim 1, wherein each of the at least one simulated device connected to the simulated host computing device is:
a voltage sensor:
a computer tachometer sensor;
an Inter-Integrated Circuit (I2C) device;
a power supply unit (PSU);
a complex programmable logic device (CPLD);
a field-replaceable unit (FRU);
a Redundant Array of Independent Disks (RAID) controller;
a RAID-on-chip (ROC);
a network interface card (NIC);
a satellite management controller;
an interface connected to the satellite management controller;
a system interface;
a universal serial bus (USB) interface; or
a Host Embedded Controller Interface (HECI).

8. A method for platform simulation for development, projects of a management controller, the method comprising:
providing a simulator module in the management controller to simulate a simulated host computing device for the management controller and at least one simulated device connected to the simulated host computing device;
generating, by the simulator module, at least one output signal based on configuration data of the simulated host computing device or the simulated device connected to the simulated host computing device;
sending, by the simulator module, the at least one output signal to a firmware module of the management controller, such that the firmware module receives the at least one output signal from the simulated host computing device or from the at least one simulated device connected to the simulated host computing device;
upon receiving the at least one output signal from the simulated host computing device or from the at least one simulated device connected to the simulated host computing, device, performing, the firmware module, a test using the at least one output signal,
wherein the firmware module and the simulator module are both stored in a storage device of the management controller and executable at a processor of the management controller; and
wherein the management controller is a baseboard management controller (BMC).

9. The method as claimed in claim 8, wherein the firmware module comprises a library module storing a plurality of library programs for the simulated host computing device and the at least one simulated device connected to the simulated host computing device, and the simulator module comprises:
a data store storing the configuration data of the simulated host computing device or the simulated device connected to the simulated host computing device; and at least one simulator library sub-module, each configured to simulate one of the at least one simulated device by:
receiving a first command from one of the library programs of the library module;
generating the at least one output signal as a first response to the first command for the at least one simulated device based on the configuration data stored in the data store; and
sending the first response to the library module.

10. The method as claimed in claim 9, wherein the simulator module further comprises:
at least one simulator driver sub-module, each configured to simulate one of the at least one simulated device controlled by a driver by:
receiving a second command from the driver;
generating the at least one output signal as a second response to the second command for the at least one simulated device based on the configuration data stored in the data library; and
sending the second response to the driver.

11. The method as claimed in claim 8, wherein the configuration data comprises:
platform data for the simulated host computing device;
device data for the at least one simulated device connected to the simulated host computing device; and
device specific configuration parameters for the at least one simulated device connected to the simulated host computing device.

12. The method as claimed in claim 11, Wherein each of the device specific configuration parameters is a static value, a random value within a range, a value obtained from one or more patterns a value derived from a function of another set of variables, a value set by an administrator, a time-based value, or a value picked from a socket server.

13. The method as claimed in claim 8, wherein each of the at least one device connected to the simulated host computing device is:
a voltage sensor;
a computer tachometer sensor;
an Inter-Integrated Circuit (I2C) device;
a power supply unit (PSU);
a complex programmable logic device (CPLD);
a field-replaceable unit (FRU);
a Redundant Array of Independent Disks (RAID) controller;
RAID-on-chip (ROC);
a network interface card (NIC);
a satellite management controller;
an interface connected to the satellite management controller;
a system interface;
a universal serial bus (USB) interface; or
a Host Embedded Controller Interface (HECI).

14. A non-transitory computer readable medium storing computer executable code, wherein the computer executable code, when executed at a processor of a management controller, is configured to:
control a simulator module to simulate a simulated host computing device for the management controller and at least one simulated device connected to the simulated host computing device;
control the simulator module to generate at least one output signal based on configuration data of the simulated host computing device or the simulated device connected to the simulated host computing device;
control the simulator module to send the at least one output signal to a firmware module of the management controller, such that the firmware module receives the at least one output signal from the simulated host computing device or from the at least one simulated device connected to the simulated host computing device; and
upon receiving the at least one output signal from the simulated host computing device or from the at least one simulated device connected to the simulated host computing device, control the firmware module to perform a test using the at least one output signal,
wherein the firmware module and the simulator module are both stored in a storage device of the management controller and executable at the processor of the management controller; and
wherein the management controller is a baseboard management controller (BMC).

15. The non-transitory computer readable medium as claimed in claim 14, wherein the firmware module comprises a library module storing a plurality of library programs for the simulated host computing device and the at least one simulated device connected to the simulated host computing device, and the simulator module comprises:
a data store storing the configuration data of the simulated host computing device or the simulated device connected to the simulated host computing device;
at least one simulator library sub-module, each configured to simulate one of the at least one simulated device by:
receiving a first command from one of the library programs of the library module;
generating the at least one output signal as a first response to the first command for the at least one simulated device based on the configuration data, stored in the data store; and
sending the first response to the library module; and
at least one simulator driver sub-module, each configured to simulate one of the at least one simulated device controlled by a driver by:
receiving a second command from the driver;
generating the at least one output signal as a second response to the second command for the at least one simulated device based on the configuration data stored in the data library; and
sending the second response to the driver.

16. The non-transitory computer readable medium as claimed in claim 14, wherein the configuration data comprises:
platform data for the simulated host computing device;
device data for the at least one device connected to the simulated host computing device; and
device specific configuration parameters for the at least one device connected to the simulated host computing device,
wherein each of the device specific configuration parameters is a static value, a random value within a range, a value obtained from one or more patterns, a value derived from a function of another set of variables, a value set by an administrator, a time-based value, or a value picked from a socket server.

17. The non-transitory computer readable medium as claimed in claim 14, wherein each of the at least one simulated device connected to the simulated host computing device is:
a voltage sensor;
a computer tachometer sensor;
an Inter-Integrated Circuit (I2C) device;
a power supply unit (PSU);
a complex programmable logic device (CPLD);

a field-replaceable unit (FRU);
a Redundant Array of Independent Disks (RAID) controller;
a RAID-on-chip (ROC);
a network interface card (NIC);
a satellite management controller;
an interface connected to the satellite management controller;
a system interface;
a universal serial bus (USB) interface; or
a Host Embedded Controller Interface (HECI).

* * * * *